United States Patent
Ortiz

(10) Patent No.: US 8,958,823 B2
(45) Date of Patent: Feb. 17, 2015

(54) LOCATION-BASED NETWORK SWITCHING

(75) Inventor: Guillermo Ortiz, Woburn, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 568 days.

(21) Appl. No.: 13/282,587

(22) Filed: Oct. 27, 2011

(65) Prior Publication Data

US 2013/0109409 A1    May 2, 2013

(51) Int. Cl.
    *H04W 4/02*      (2009.01)
(52) U.S. Cl.
    CPC ........................................ *H04W 4/02* (2013.01)
    USPC ........................................ 455/456.3; 370/328
(58) Field of Classification Search
    USPC ............ 370/328, 331, 329; 455/456.1, 456.2, 455/456.3
    See application file for complete search history.

(56) References Cited

U.S. PATENT DOCUMENTS

| | | | |
|---|---|---|---|
| 2008/0019317 A1* | 1/2008 | Vellanki et al. | 370/331 |
| 2013/0084891 A1* | 4/2013 | Khorashadi et al. | 455/456.3 |

* cited by examiner

*Primary Examiner* — Myron K Wyche

(57) ABSTRACT

A mobile device stores, in a memory, a network interface setting associated with a particular geographic location. The network interface setting includes a particular combination of enabled and disabled wireless network interfaces. The mobile device determines a current geographic location of the mobile device and identifies a match between the stored particular geographic location and the current geographic location. The mobile device applies, based on identifying the match, the network interface setting associated with stored particular geographic location.

20 Claims, 6 Drawing Sheets

LOCATION-BASED NETWORK SWITCHING

BACKGROUND

Many of today's mobile devices (e.g., smart phones, tablet computers, etc.) are capable of connecting to multiple wireless networks, such as mobile telecommunications networks (3G/4G cellular networks), wireless local area networks (e.g., Wi-Fi™ using IEEE 802.11 standards), wireless personal area networks (e.g., Bluetooth™ using IEEE 802.15 standards), etc. Each type of wireless network may have its own advantages and disadvantages. For example, a cellular network may provide a large coverage area (e.g., national coverage), while requiring moderate power consumption for mobile devices with a moderate data rate (e.g., about 1 Mbps). A wireless local area network, in contrast, may provide a smaller coverage area (e.g., for a home or neighborhood), while requiring high power consumption and providing fast data rates (e.g., over 10 Mbps). A wireless personal area network may provide short-range coverage (e.g., up to a 30 feet radius), low power consumption, and comparatively lower data rates (e.g., about 800 Kbps).

DETAILED DESCRIPTION OF PREFERRED EMBODIMENTS

The following detailed description refers to the accompanying drawings. The same reference numbers in different drawings may identify the same or similar elements.

For mobile devices that are capable of connecting to multiple wireless networks, it is not efficient to keep all the network interfaces enabled at all times. Maintaining an active interface for an unused network may squander valuable battery power. Also, use of some networks may incur undesirable costs to consumers (e.g., data rate plans) or network providers (e.g., bandwidth consumption). Users of mobile devices may manually enable/disable particular network interfaces depending on the users' particular needs. However, manually changing settings on the mobile device can be highly inconvenient or easily forgotten.

Systems and/or methods described herein may detect and automatically enable/disable wireless network interfaces for a mobile device based on the detection of the location of the mobile device. For example, the systems and/or methods may detect global position information and network signal strengths to automatically switch among user-defined wireless network configurations. In one implementation, the systems and/or methods may store network interface settings associated with geographic locations. Each of the network interface settings may include a particular combination of enabled and disabled wireless network interfaces (e.g., for a WPAN, a WLAN, a cellular network, etc.) associated with a particular geographic location. The systems and/or methods may identify a current geographic location of the mobile device and compare the current geographic location with the particular geographic locations in the stored network interface settings. The systems and/or methods may maintain a current combination of enabled and disabled wireless network interfaces when the current geographic location does not match one of the particular geographic locations, and may apply one of the particular combinations from the network interface settings when the current location matches one of the particular geographic locations.

Figure 1:
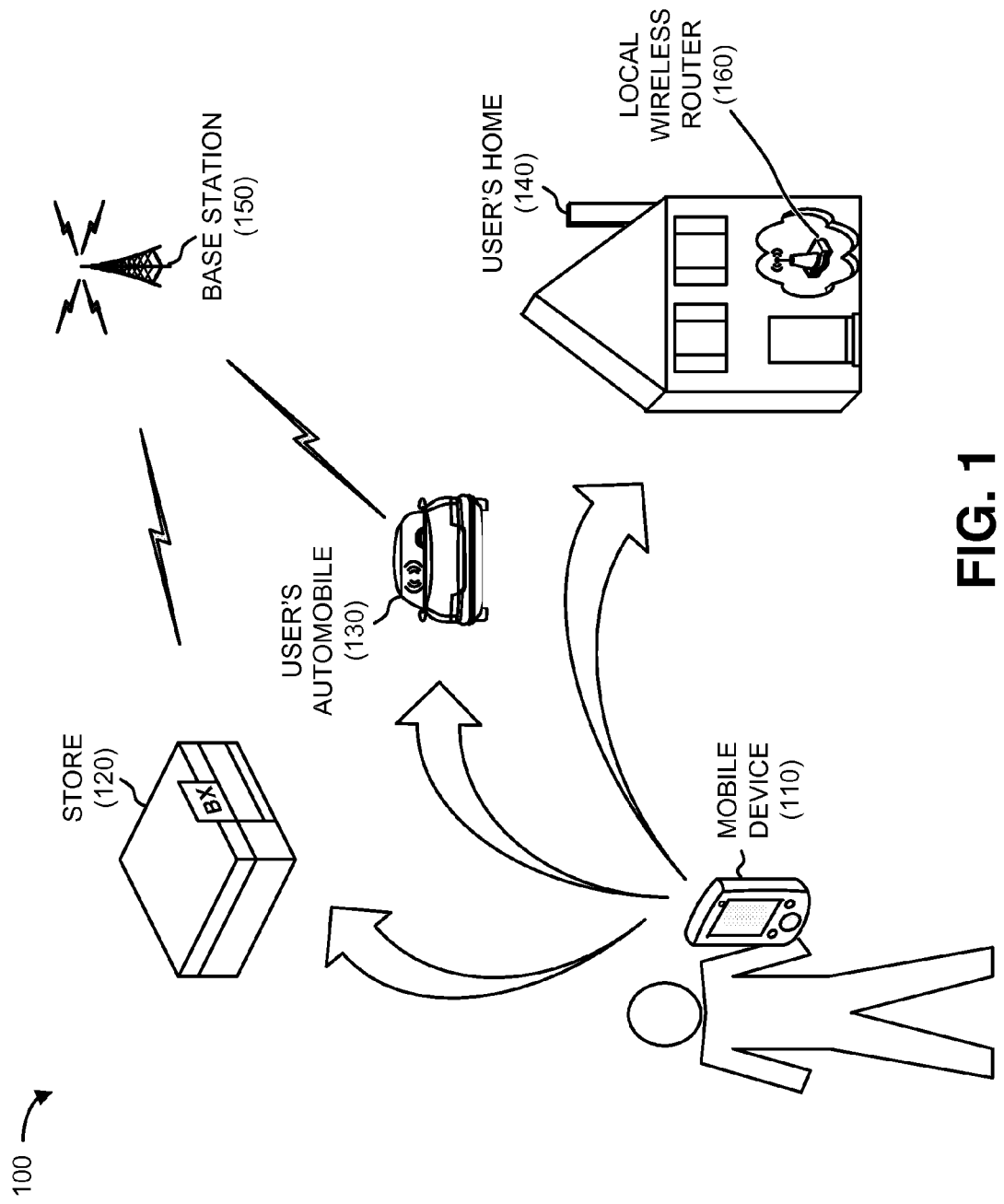
FIG. 1 illustrates concepts described herein.

FIG. 1 illustrates concepts described herein. As shown in FIG. 1, a mobile device 110 may be used in a variety of environments, including a retail establishment (or store) 120, a user's automobile 130, and a user's home 140. When a user is at store 120, mobile device 110 may rely on a mobile telecommunications network (e.g., 2G/3G/4G cellular network) via connection to base station 150. However, in the environment of store 120, mobile device 110 may have no need for other wireless network interfaces, such as a wireless local area network (WLAN, such as Wi-Fi™) or a wireless personal area network (WPAN, such as Bluetooth™). When in user's automobile 130, mobile device 110 may require use of a WPAN interface (e.g., for hands-free connectivity) along with a mobile telecommunications network. When in user's home 140, mobile device 110 may rely exclusively on a WLAN (e.g., Wi-Fi via a local wireless router 160) for all connectivity and may, thus, have no need for other wireless network interfaces, such as a mobile telecommunications network or a WPAN.

In implementations described herein, mobile device 110 may detect a user's location and/or signal strength of available wireless networks in different environments (e.g., store 120, user's automobile 130, or user's home 140) to selectively enable/disable a preferred combination of wireless network interfaces for each environment. A user of mobile device 110 may configure network interface settings for known environments (e.g., user's home 140) and may rely on default settings for other environments (e.g., store 120). For example, when mobile device 110 detects, based on geolocation information, that a user is in/near home 140, mobile device 110 may automatically enable a WLAN interface and may disable a WPAN interface and a cellular network interface. When the user departs home 120, mobile device 110 may detect the loss of signal strength over the WLAN interface and may automatically enable one or more other network interfaces until another known environment (e.g., user's automobile 130) may be determined. Mobile device 110 may then configure network interface settings for the known environment.

Figure 2:
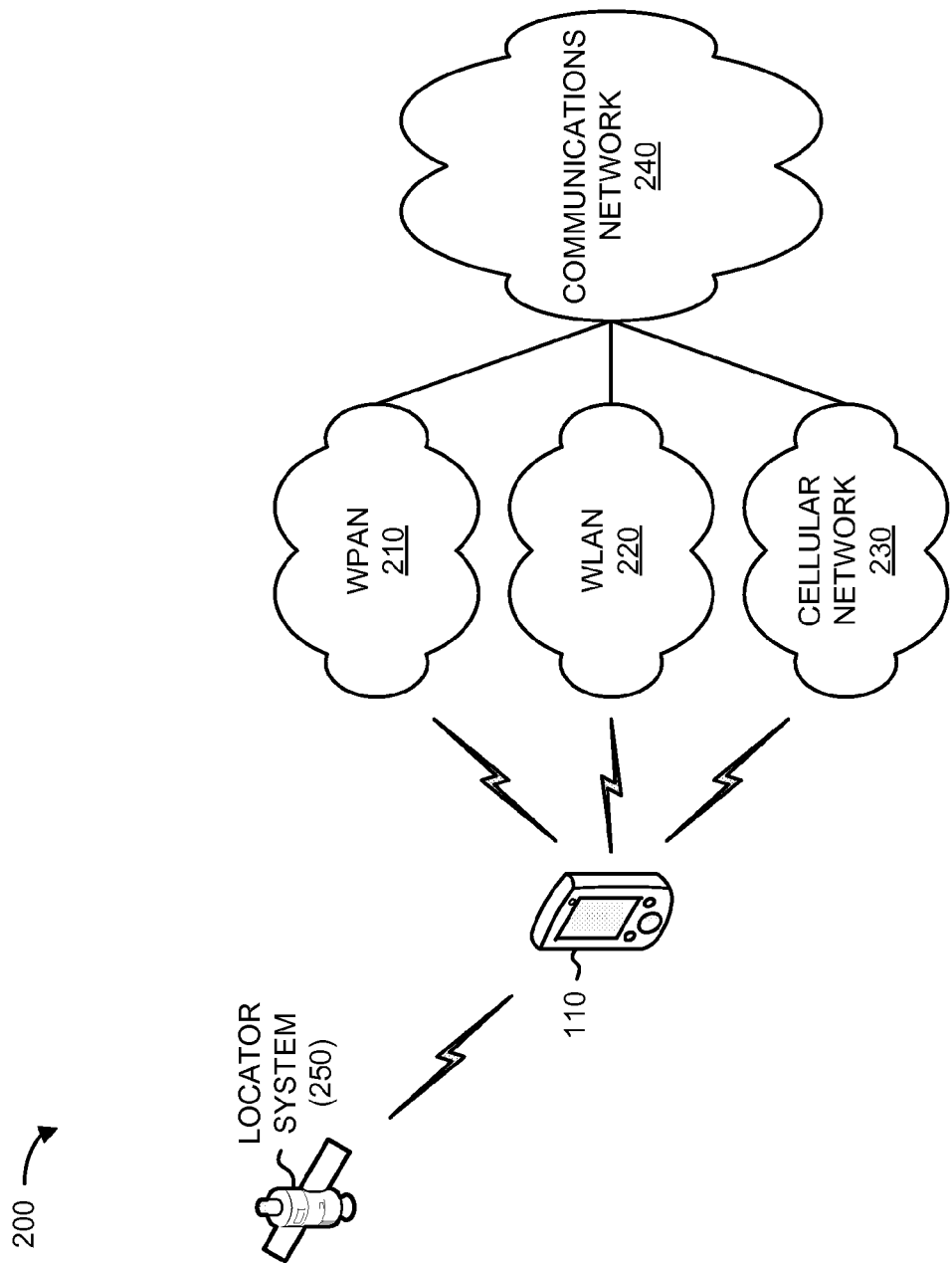
FIG. 2 depicts an exemplary network in which systems and/or methods described herein may be implemented.

FIG. 2 is an exemplary network 200 in which systems and/or methods described herein may be implemented. As illustrated, network 200 may include mobile device 110, a WPAN 210, a WLAN 220, a cellular network 230, a communications network 240, and a locator system 250. The particular arrangement and number of components of network 200 shown in FIG. 2 are illustrated for simplicity. In practice there may be more mobile devices 110, WPANs 210, WLANs 220, cellular networks 230, communications networks 240, and/or locator systems 250. Components of network 200 may be connected via wired and/or wireless links.

Mobile device 110 may include a smart phone, a tablet computer, a radiotelephone, a laptop computer, a gaming console, an e-reader device, a media player, or other types of computation or communication devices. Mobile device 110 may provide an interface to multiple wireless networks including, for example, WPAN 210, WLAN 220, and cellular network 230. Mobile device 110 may include location-detection functionality to retrieve current geo-position information for mobile device 110. In one implementation, mobile device 110 may include any device that is capable of accessing and storing a software agent that enables mobile device 110 to use geo-position information to automatically enable/disable a network interface.

WPAN 210 may include a wireless network implementing a short-range wireless standard, such as the Bluetooth standard. In one implementation, WPAN 210 may allow mobile device 110 to connect to another device (not shown), such as another mobile device, a gateway to another network, or an accessory (e.g., a printer, speaker, etc.) for mobile device 110.

WLAN 220 may include a wireless network implementing a medium-range wireless standard that is different than the standard used for WPAN 210. For example, WLAN 220 may implement a Wi-Fi standard. In one implementation, WLAN 220 may allow mobile device 110 to connect to other devices (not shown) within WLAN 220 or another network, such as communications network 240.

Cellular network 230 may include, several components that work together to complete a connection between devices. These components may include a backbone network, local infrastructure, and an over-the-air (OTA) segment. OTA technologies may include, for example, Global System for Mobile communications (GSM), Long-term Evolution (LTE), Ultra Mobile Broadband (UMB), Code Division Multiple Access (CDMA), Evolved Universal Terrestrial Radio Access Network (EUTRAN), Evolution-Data Optimized (EVDO), Personal Communications Service (PCS), Time Division Multiple Access (TDMA), second generation (2G), third generation (3G), fourth generation (4G), ad hoc, High-Speed Packet Access (HSPA), and the like. In one implementation, cellular network 230 may allow mobile device 110 to connect to other devices within cellular network 230 (not shown) or another network, such as communication network 240.

Communications network 240 may include one or more networks including another wireless network, a satellite network, the Internet, a telephone network, such as the Public Switched Telephone Network (PSTN), a metropolitan area network (MAN), a wide area network (WAN), a local area network (LAN), a mesh network, a fiber-optics network (e.g., passive optical networks (PONS)), an ad hoc network, or another type of network. In an exemplary implementation, communications network 240 may include a combination of networks and other components (e.g., switches, routers, etc.) for transmitting data to and from mobile device 110. For example, WLAN 220 or cellular network 230 may connect to communications network 240 to allow mobile device 110 to communicate with services providers and/or other devices. In exemplary implementations, communications network 240 may provide access to a service provider that facilitates voice, text, and/or data services over a proprietary interface and/or protocol.

Locator system 250 may include a satellite global positioning system (GPS), a cellular tower triangulation system, a WLAN access point locating system, a global navigation satellite system (GNSS), or another system that determines real-time (or near real-time) location information for subscribing devices, such mobile device 110. In one implementation, locator system 250 may include a satellite to broadcast information to mobile device 110. In another implementation locator system 250 may include one or more other systems (e.g., a location information server) to gather/provide information about the position, direction, and/or destination of mobile device 110.

Although FIG. 2 shows exemplary components of network 200, in other implementations, network 200 may contain fewer, different, differently arranged, or additional components than depicted in FIG. 2. For example, mobile device 110 may connect to other networks such as ultra-wideband (UWB), Digital Enhanced Cordless Telecommunications (DECT), WiMAX, other personal area networks, etc.

Figure 3:
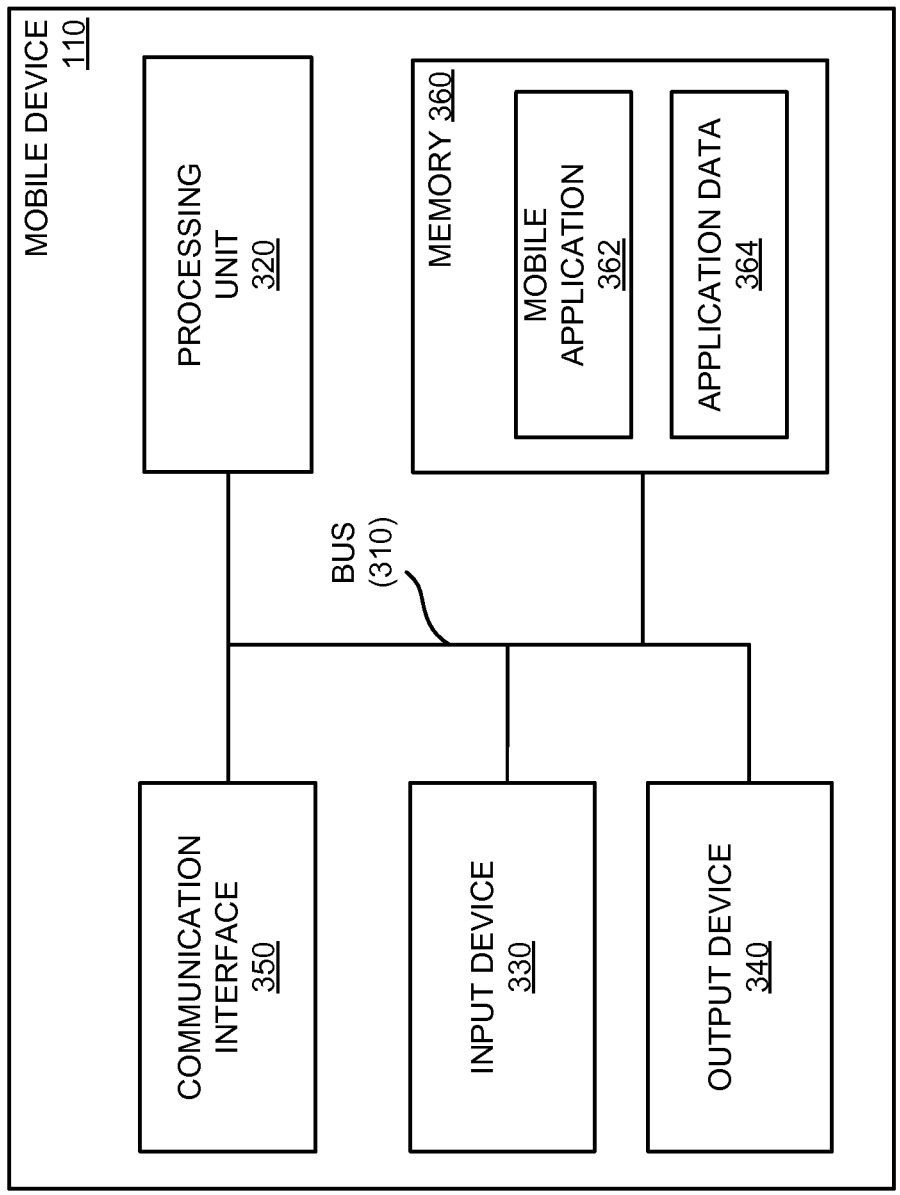
FIG. 3 is a block diagram of exemplary components of a user device.

FIG. 3 is a block diagram of exemplary components of mobile device 110. Mobile device 110 may include a bus 310, processing unit 320, an input device 330, an output device 340, a communication interface 350, and a memory 360. Mobile device 110 may include other components (not shown) that aid in receiving, transmitting, and/or processing data. Moreover, other configurations of components in mobile device 110 are possible.

Bus 310 may include a path that permits communication among the components of mobile device 110. Processing unit 320 may include any type of processor or microprocessor (or groups of processors or microprocessors) that interprets and executes instructions. In other embodiments, processing unit 320 may include an application-specific integrated circuit (ASIC), a field-programmable gate array (FPGA), or the like.

Input device 330 may include a device that permits a user to input information into mobile device 110, such as a keyboard, a mouse, a pen, a, a remote control, a touch-screen display, etc. Output device 340 may include a device that outputs information to the user, such as a display, a speaker, etc. Output device 340 may also include a vibrator to alert a user.

Input device 330 and output device 340 may allow the user to activate a particular service or application, such as a location-based network switching. Input device 330 and output device 340 may allow the user to receive and view a menu of options and select from the menu options. The menu may allow the user to select various functions or services associated with applications executed by mobile device 110.

Communication interface 350 may enable mobile device 110 to communicate with other devices and/or systems. Communication interface 350 may include a transmitter that may convert baseband signals to radio frequency (RF) signals and/or a receiver that may convert RF signals to baseband signals. Alternatively, communication interface 350 may include a transceiver to perform functions of both a transmitter and a receiver. Communication interface 350 may be coupled to an antenna for transmission and reception of the RF signals. Communications interface 350 may include a network interface card, e.g., Ethernet card, for wired communications or a wireless network interface (e.g., a Wi-Fi) card for wireless communications. Communication interface 350 may also include, for example, a universal serial bus (USB) port for communications over a cable, a Bluetooth wireless interface for communicating with Bluetooth devices, a near-field communication (NFC) interface, etc. Communication interface 350 may implement a wireless communication protocol, e.g., LTE, GSM, CDMA, WCDMA, GPRS, EDGE, etc. Communications interface 350 may also receive, transmit and/or process digital or analog audio inputs/outputs and/or digital or analog video inputs/outputs.

Memory 360 may include a random access memory (RAM) or another type of dynamic storage device that may store information and instructions, e.g., an application, for execution by processing unit 320; a read-only memory (ROM) device or another type of static storage device that may store static information and instructions for use by processing unit 320; and/or some other type of magnetic or optical recording medium and its corresponding drive, e.g., a hard disk drive (HDD), for storing information and/or instructions.

Consistent with implementations described herein, memory 360 may include a mobile application 362 and application data 364. Mobile application 362 may provide a user interface to control and configure network interface settings. Mobile application 362 may also include a background component to provide location updates for determining applicable network interface settings. In some instances, mobile application 362 may cause mobile device 110 to automatically enable and/or disable particular wireless network interfaces. Application data 364 may store configuration settings (e.g., networks settings associated with particular geographic locations and/or default settings for unknown locations).

As described herein, mobile device 110 may perform certain operations in response to processing unit 320 executing software instructions contained in a computer-readable medium, such as memory 360. A computer-readable medium may include a non-transitory memory device. A memory device may include space within a single physical memory device or spread across multiple physical memory devices. The software instructions may be read into memory 360 from another computer-readable medium or from another device via communication interface 350. The software instructions contained in memory 360 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Figure 4:
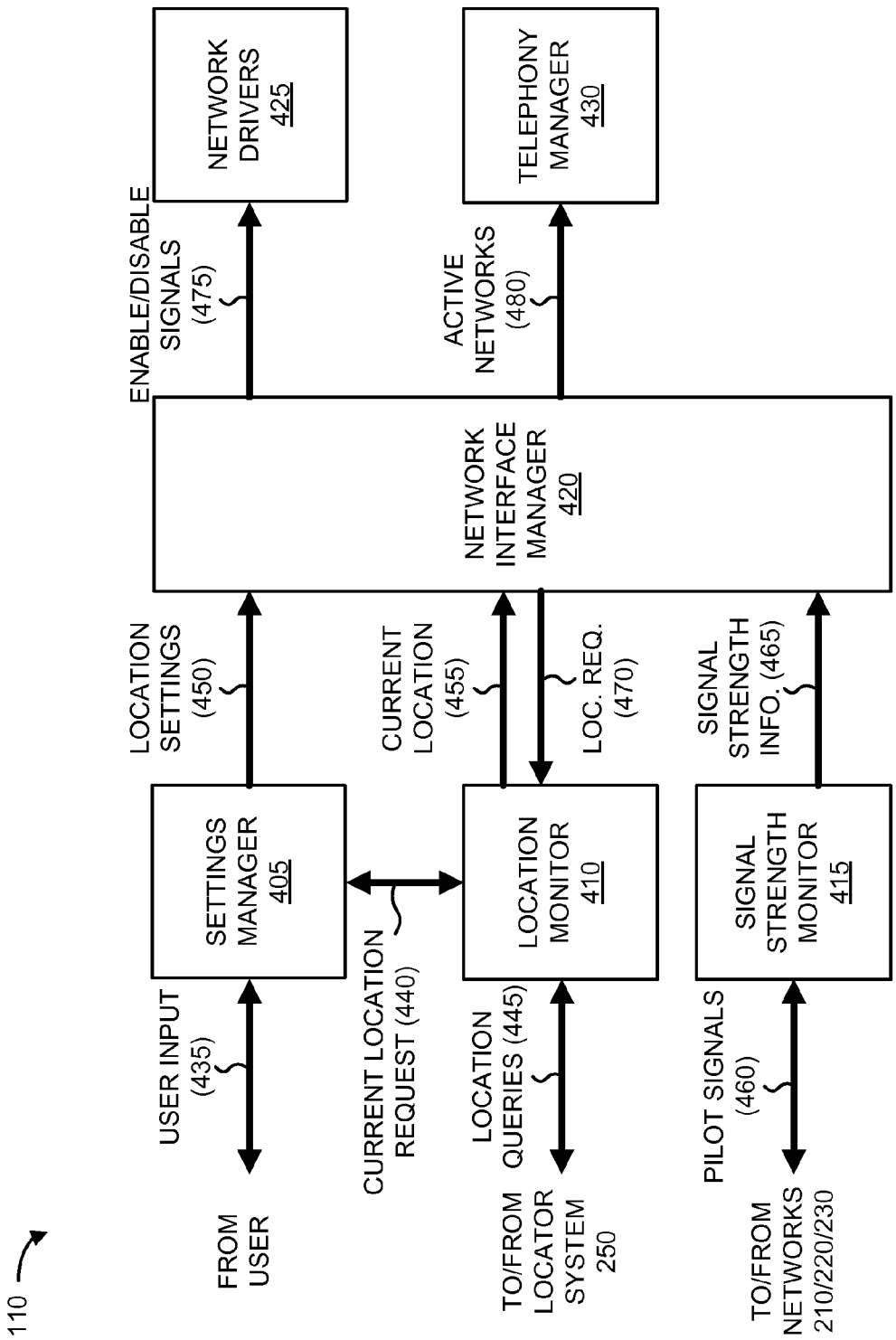
FIG. 4 is a diagram of exemplary functional components of the user device of FIG. 1.

FIG. 4 depicts a diagram of communications among exemplary functional components of mobile device 110. As shown in FIG. 4, mobile device 110 may include a settings manager 405, a location monitor 410, a signal strength monitor 415, a network interface manager 420, network drivers 425, and a telephony manager 430. In one implementation, settings manager 405, location monitor 410, signal strength monitor 415, network interface manager 420, network drivers 425, and telephony manager 430 may be implemented within processing unit 320 and/or memory 360 of mobile device 110.

Settings manager 405 may provide a user interface to control and configure network interface settings for mobile device 110. For example, as shown in FIG. 4, settings manager 405 may solicit and receive user input 435 from a user. User input 435 may include settings to enable and/or disable particular wireless networks (e.g., WPAN 210, WLAN 220, and/or cellular network 230) for a current location of mobile device 110. In one implementation, each time a user enables or disables a network interface, settings manager 405 may present an option to the user to save or update network interface settings and/or assign a location name (e.g., "home," "office," "coffee shop," etc.).

Settings manager 405 may conduct a current location request 440 from location monitor 410 to determine a location associated with user input 435. For example, when a user provides user input 435, settings manager 405 may initiate current location request 440 that causes location monitor 410 to perform a location query 445 to retrieve location information from locator system 250. Location monitor 410 may provide the current location information to settings manger 405 as a responsive part of current location request 440. Settings manager 405 may associate user input 435 and current location 440 as location settings 450 and provide location settings 450 to network interface manager 420. Network interface manager 420 may receive location settings 450 and may store location settings 450 for future use. In one implementation network interface manager 420 may store location settings 450 in a table or another data structure along with location settings 450 for other locations.

Location monitor 410 may run as a background service that provides location updates to settings manager 405 and/or network interface manager 420. Location monitor 410 may communicate, for example, with locator system 250. Location monitor 410 may include, for example, GPS functionality, assisted-GPS, or other location-determination technology. Location monitor 410 may conduct location queries 445 in response to current location requests 440 from settings manager 405 (e.g., when a user is configuring network interface settings for a new location). Location monitor 410 may also conduct periodic location queries 445 (e.g., from locator system 250) to determine the current location of mobile device 110. Periodic location queries 445 may be conducted, for example, every few seconds or minutes. Location monitor 410 may provide location information to network interface manager 420 as current location 455. Current location 455 may be provided in the form of, for example, GPS coordinates, latitude and longitude coordinates, or other geo-position coordinates.

In one example implementation, location monitor 410 may rely only on a GPS satellite to determine a location of mobile device 110. In another example implementation, a position determining entity (e.g., a network server) may assist location monitor 410 in determining GPS coordinates by providing ephemeris data to location monitor 410 to allow faster identification of satellites within view of mobile device 110. For example, upon receiving a location request, location monitor 410 may communicate with a location-based service infrastructure (e.g., via cellular network 230) and a GPS satellite to determine a geographical location of mobile device 210. Additionally, or alternatively, location monitor 410 may retrieve location information in the form of cellular tower triangulation information collected from mobile device 110. Location monitor 410 may also retrieve location information in the form of WLAN access point location information. In some implementations, the type of location information obtained by location monitor 410 may be limited by whether access to a particular network interface (e.g., communication interface 350) of mobile device 110 is currently enabled.

Signal strength monitor 415 may monitor signal strength for one or more wireless access networks, such as WPAN 210, WLAN 220, and/or cellular network 230, when a corresponding network interface of mobile device 110 is enabled. In one implementation, signal strength monitor 415 may measure pilot signals 460 sent from/to a base station (e.g., base station 150), a wireless access point (e.g., local wireless router 160), or another device. Signal strength monitor 415 may monitor signal strength periodically (e.g., every few seconds). In an exemplary implementation, signal strength measurements may be provided to network interface manager 420 as signal strength information 465.

Network interface manager 420 may receive location settings 450 from settings manager 405, current location 455 from location monitor 410, and signal strength information 465 from signal strength monitor 415. Network interface manager 420 may enable or disable specific network interfaces based on current location 455 and/or signal strength information 465. For example, network interface manager 420 may compare current location 455 with stored location settings 450. When a current location 455 matches a location in stored location settings 450, network interface manager 420 may configure network interfaces to match the stored network interface settings associated with the stored location. In one implementation, network interface manager 420 may apply a tolerance to detect a match between a current location and a stored location. For example, network interface manager 420 may attempt to configure network interfaces to correspond to a stored location when the current location is within a particular distance (e.g., 50 feet) of the stored location. If current location 455 does not match a location in stored location settings 450, network interface manager 420 may configure network interfaces to match a default configuration.

In another implementation, network interface manager 420 may receive signal strength information 465 that indicates a particular location or environment. For example, signal strength information 465 may indicate low (or lost) signal strength for WLAN 220 that is indicative of mobile terminal 110 having been moved to a different area (e.g., prior to receiving a periodic location update from location monitor 410). Based on signal strength information 465, network interface manager 420 may, for example, initiate a location request 470 to retrieve updated location information. In response to location request 470, location monitor 410 may provide current location information 455 to network interface manager 420. Based on the updated location information, network manager 420 may determine if mobile device 110 has been moved to a known location (e.g., with stored location settings) or to an unknown location (e.g., where default settings should be applied). In another implementation, signal strength information 465 may indicate availability of a paired device (e.g., for WPAN 210).

Network interface manager 420 may send signals 475 to network drivers 425 to enable or disable particular wireless network interfaces. Network drivers 425 may allow network interface manager 420 to interact with network interfaces (e.g., communication interfaces 350) for different networks. For example, network drivers 425 may include original equipment manufacturer (OEM) drivers within an operating system (such as the Android™ operating system) of mobile device 120. In one implementation, network drivers 425 may include one or more separate drivers for connecting to each of WPAN 210, WLAN 220, and cellular network 230.

Telephony manager 430 may enable voice services over multiple types of networks. For example, telephony manager 430 may configure mobile device 110 to provide voice services over cellular network 230 when cellular network 230 is enabled, and may configure mobile device 110 to provide voice services over WLAN 220 or another active network when cellular network 230 is not enabled. Network interface manager 420 may send to telephony manager 430 an indication of active networks 480.

In one implementation, network interface manager 420 may coordinate timing of enable/disable signals 475 to network drivers 425 and indications of active networks 480 to telephony manager 430 to gracefully transition between active networks. For example, network interface manager 420 is transitioning from exclusive use of a cellular network (e.g., cellular network 230) to exclusive use of a WLAN (e.g., WLAN 220), network interface manager 420 may permit interfaces for both wireless networks to remain active until active sessions using the cellular network are terminated and/or transferred.

Although FIG. 4 shows exemplary communications among functional components of mobile device 110, in other implementations, mobile device 110 may contain fewer, different, differently-arranged, or additional functional components than depicted in FIG. 4. Additionally, or alternatively, one or more functional components of mobile device 110 may perform one or more other tasks described as being performed by one or more other functional components of mobile device 110.

Figure 5:
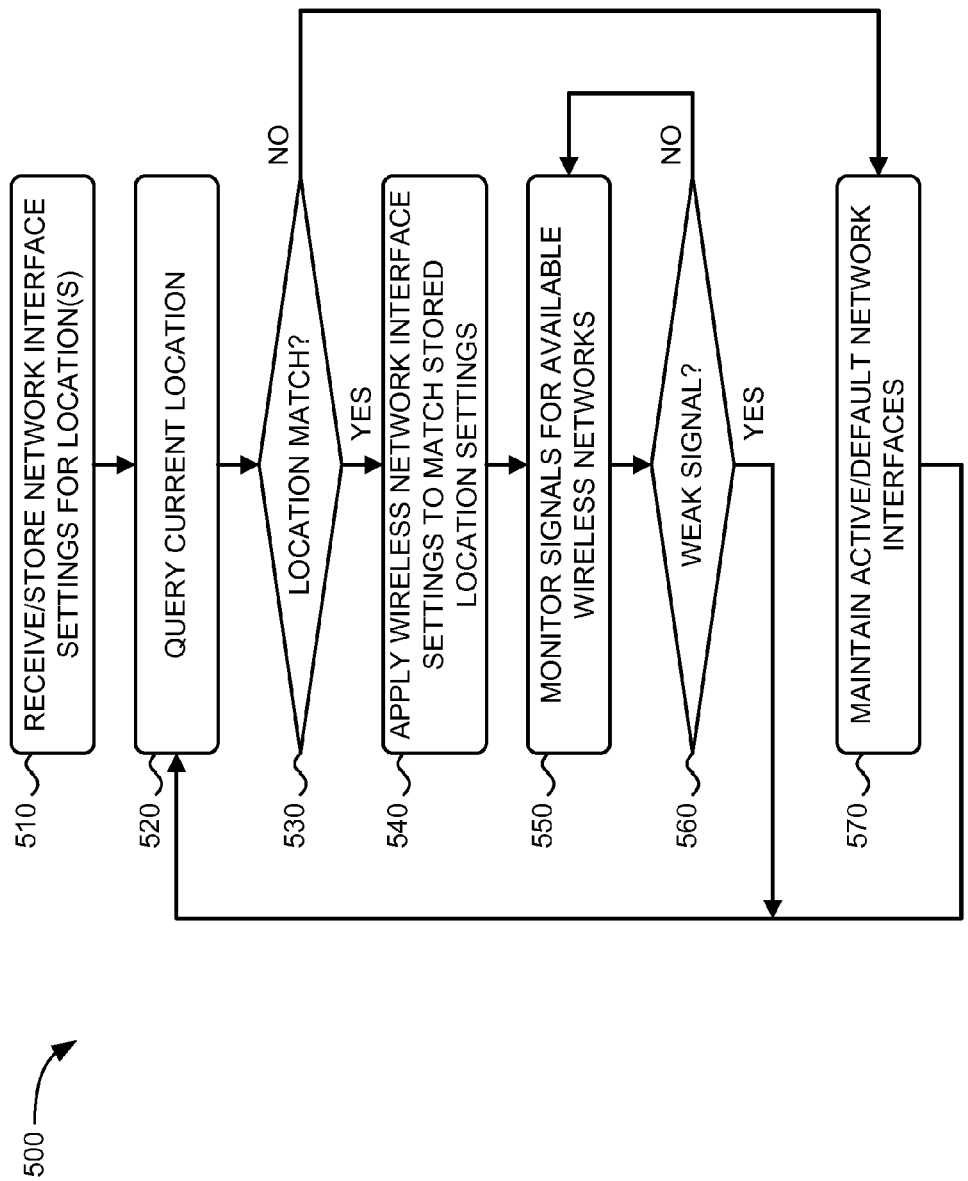
FIGS. 5 and 6 are flowcharts of an exemplary process for performing location-based network switching according to an implementation described herein.

FIG. 5 is a flow chart of an example process for performing location-based network switching according to an implementation described herein. In one implementation, process 500 may be performed by mobile device 110. In another implementation, some or all of process 500 may be performed by another device or group of devices, including or excluding mobile device 110.

As shown in FIG. 5, process 500 may include receiving network interface configurations for one or more locations (block 510) and querying a current location (block 520). For example, referring to functional components of mobile terminal 110 described in connection with FIG. 4, settings manager 405 may receive network interface settings for WPAN 210, WLAN 220, and cellular network 230 and associate them with a particular location. Location monitor 410 may conduct periodic location queries 445 to determine the current location of mobile device 110 and provide the location information to network interface manager 420 as current location 455.

Process 500 may include determining if there is a location match between the current location and a stored location (block 530). For example, as described above in connection with FIG. 4, network interface manager 420 may compare current location 455 with stored location settings 450. In one implementation, network interface manager 420 may apply a tolerance to detect a match between a current location and a stored location. For example, network interface manager 420 may attempt to configure network interfaces to correspond to a stored location when the current location is within a particular distance of the stored location.

If there is a location match (block 530—YES), process 500 may also include applying wireless network interface settings to match the stored location settings (block 540), monitoring signals for available wireless networks (block 550), and determining if a wireless network signal is weak (block 560). For example, as described above in connection with FIG. 4, when a current location 455 matches a location in stored location settings 450, network interface manager 420 may apply a particular combination of enabled and disabled network interfaces from the stored network interface settings when the current location matches one of the particular geographic locations. Signal strength monitor 415 may monitor signal strength for one or more wireless access networks, such as WPAN 210, WLAN 220, and/or cellular network 230. Network interface manager 420 may receive signal strength information 465 that indicates mobile terminal 110 may have been moved to a different area. For example, signal strength information 465 may indicate low (or loss of) signal strength for WLAN 220.

If there is not a lost signal (block 560—NO), process 500 may return to process block 550 to continue monitoring signals for available wireless networks. If there is a lost signal (block 560—YES), process 500 may return to process block 520 to query a current location.

Returning to process block 530, if there is not a location match (block 530—NO), process 500 may include maintaining the current active/inactive network interfaces or switching to a default network interface setting (block 570). For example, if current location 455 does not match a location in stored location settings 450, network interface manager 420 may maintain current interface configurations until a known location is determined (or a user provides a configuration change). Alternatively, network interface manager 420 may configure network interfaces to match a default configuration.

Figure 6:
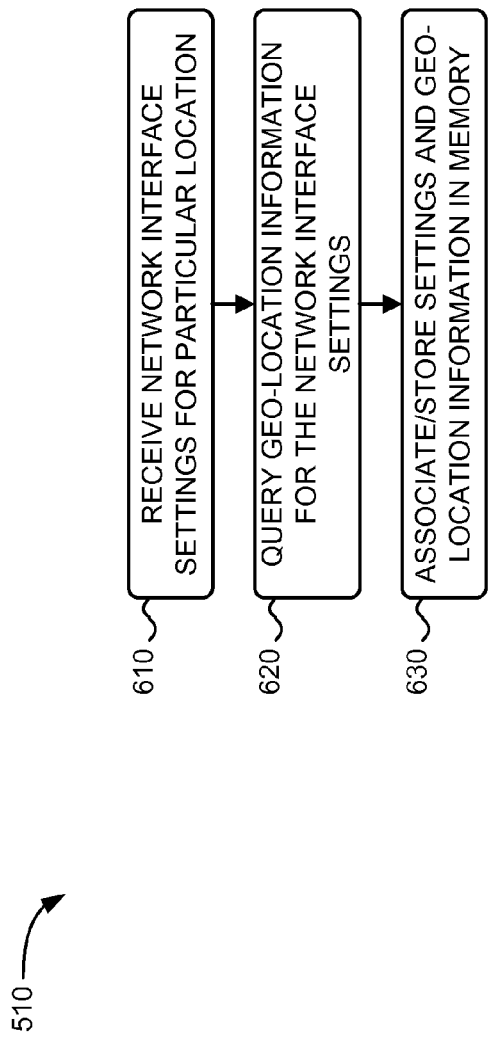

Process block 510 may include the process blocks depicted in FIG. 6. Referring to FIG. 6, network interface settings for a particular location may be received (block 610), geo-location information for the network interface settings may be queried (block 620), and the settings and geo-location information may be associated and stored in a memory (block 630). For example, as described above in connection with FIG. 4, settings manager 405 may solicit and/or receive user input 435 from a user. User input 435 may include settings to enable and/or disable particular wireless networks. In one implementation, each time a user enables or disables a network interface, settings manager 405 may present an option to the user to save or update network interface settings and/or assign a location name (e.g., "home," "office," "coffee shop," etc.). Settings manager 405 may conduct a current location request 440 from location monitor 410 to determine a location associated with user input 435. Settings manager 405 may associate user input 435 and current location 440 as location settings 450 and provide location settings 450 to network interface manager 420. Network interface manager 420 may receive location settings 450 and may store location settings 450 for future use.

Systems and/or methods described herein may allow a mobile device to automatically switch between preferred wireless network interfaces based on current locations of the mobile device. The systems and/or methods may store, in a memory, a network interface setting associated with particular geographic location. The network interface setting may include a particular combination of enabled and disabled wireless network interfaces. The systems and/or methods may determine a current geographic location of the mobile device and may identify a match between the stored particular geographic location and the current geographic location. The systems and/or methods may apply, based on identifying the match, the network interface setting associated with the stored particular geographic location.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 5 and 6, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method implemented by a mobile device, the method comprising:
   storing, by the mobile device, network interface settings associated with particular geographic locations, wherein each of the network interface settings includes particular combinations of enabled and disabled wireless network interfaces associated with particular geographic locations;
   identifying, by the mobile device, a current geographic location of the mobile device;
   applying, by the mobile device, one of the particular combinations from the network interface settings when the current location matches one of the particular geographic locations;
   monitoring, by the mobile device, a signal strength of a wireless network associated with an enabled interface of the one of the particular combinations;
   detecting, based on the monitoring, a reduction of signal strength for the wireless network;
   initiating, by the mobile device and based on the detecting, a location request to retrieve an updated geographic location of the mobile device; and
   applying, by the mobile device, a different one of the particular combinations from the network interface settings when a change in geographic location of the mobile device is detected.

2. The method of claim 1, further comprising:
   applying a default combination from the network interface settings when a change in geographic location of the mobile device is not detected.

3. The method of claim 2, further comprising:
   receiving, from a user the default combination.

4. The method of claim 1, wherein the network interface settings include settings for:
   a wireless personal area network (WPAN) interface,
   a wireless local area network (WLAN) interface, and
   a cellular network interface.

5. The method of claim 1, further comprising:
   maintaining a default combination of enabled and disabled wireless network interfaces when the current geographic location does not match one of the particular geographic locations.

6. The method of claim 1, further comprising:
   detecting, from a user, configuration input to enable or disable one of the wireless network interfaces; and
   associating the configuration input with the current geographic location.

7. The method of claim 6, further comprising:
   prompting the user to save the configuration input.

8. The method of claim 1, wherein identifying a current geographic location of the mobile device includes:
   receiving location information from a remote locator system.

9. The method of claim 1, wherein the current geographic location includes one or more of:
   global positioning system (GPS) coordinates, or
   latitude and longitude coordinates.

10. A mobile device, comprising:
    a memory to store a plurality of instructions; and one or more processors configured to execute the instructions in the memory to:
  store, in the memory, a network interface setting associated with a particular geographic location, wherein the network interface setting includes a particular combination of enabled and disabled wireless network interfaces,
  determine a current geographic location of the mobile device,
  identify a match between the stored particular geographic location and the current geographic location,
  apply, based on the identifying, the network interface setting associated with the stored particular geographic location,
  monitor a signal strength of a wireless network associated with an enabled wireless network interface,
  detect, based on the monitoring, a reduction of signal strength for the wireless network interface,
  initiate, based on the detecting, a location request to retrieve an updated geographic location of the mobile device, and
  apply a different network interface setting associated with a different geographic location when a change in geographic location of the mobile device is detected.

11. The mobile device of claim 10, wherein the one or more processor are further configured to execute instructions to:
  detect a change in geographic location of the mobile device, and
  apply a different combination of enabled and disabled wireless network interfaces based on the change in geographic location.

12. The mobile device of claim 11, wherein the one or more processors are further configured to execute instructions to:
  apply a default combination of enabled and disabled wireless network interfaces based on the detected reduction in signal strength when a change in geographic location of the mobile device is not detected.

13. The mobile device of claim 10, wherein the mobile device includes:
  a wireless personal area network (WPAN) interface,
  a wireless local area network (WLAN) interface, and
  a cellular network interface,
  and wherein the particular combination of enabled and disabled wireless network interfaces includes any combination of the WPAN interface, the WLAN interface, and the cellular network interface.

14. The mobile device of claim 10, wherein the one or more processors are further configured to:
  receive, from a user, configuration input to enable or disable one of the wireless network interfaces, and
  associate the configuration input with the current geographic location.

15. The mobile device of claim 10, wherein the one or more processors are further configured to:
  enable voice services using different types of wireless network interfaces on the mobile device.

16. The mobile device of claim 10, wherein the one or more processors are further configured to:
  obtain location information from a remote locator system, and
  determine the current geographic location of the mobile device based on the obtained location information.

17. The mobile device of claim 10, wherein the mobile device includes one of:
  a smart phone,
  a tablet computer,
  a radiotelephone,
  a laptop computer,
  a gaming console,
  an e-reader device, or
  a media player device.

18. A non-transitory computer-readable medium including instructions executable by at least one processor, the computer-readable medium comprising one or more instructions for:
  soliciting user input to store one or more network interface settings associated with a geographic location;
  storing the one or more network interface settings associated with the geographic location, wherein the one or more network interface settings includes a particular combination of enabled and disabled network interfaces for a wireless personal area network, a wireless local area network, and a cellular network;
  periodically monitoring current geographic coordinates of a mobile device;
  comparing the current geographic coordinates to the stored geographic location;
  enabling one of the one or more network interface settings when the current geographic coordinates match the stored geographic location;
  monitoring a signal strength of a wireless network associated with the enabled one of the one or more network interface settings;
  detecting, based on the monitoring the signal strength, a reduction of signal strength for the wireless network;
  initiating, based on the detecting, a location request, separate from the periodic monitoring, to retrieve an updated geographic location of the mobile device; and
  applying a different network interface setting associated with a different geographic location when a change in geographic location of the mobile device is detected.

19. The non-transitory computer-readable medium of claim 18, further comprising one or more instructions for:
  enabling voice services using the network interface for the wireless local area network and the cellular network.

20. The non-transitory computer-readable medium of claim 18, further comprising one or more instructions for:
  disabling the one of the one or more network interface settings when the current geographic coordinates no longer match the stored geographic location.

* * * * *